Figure 1:
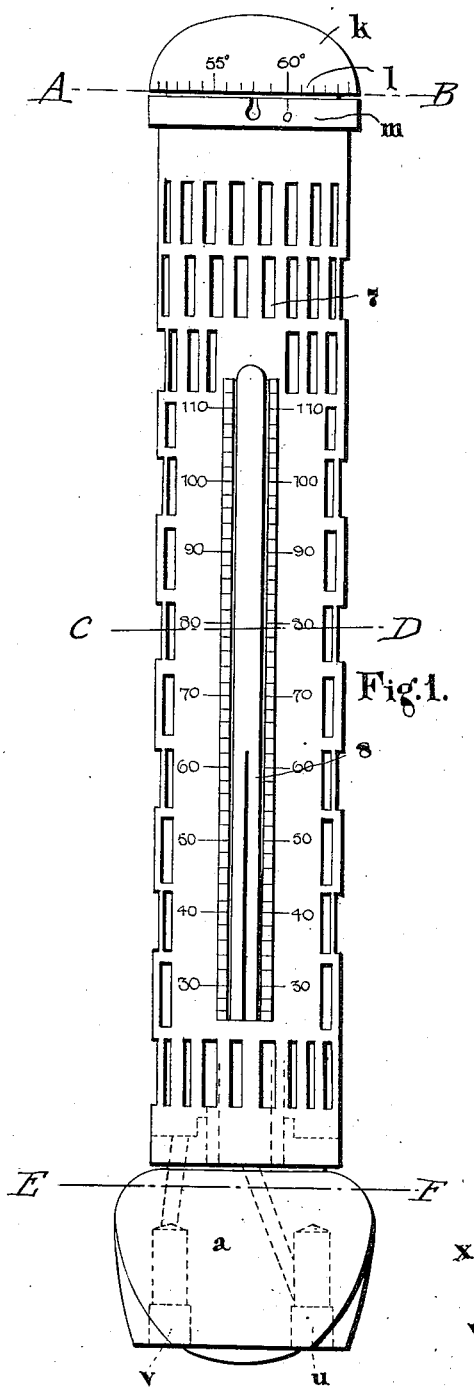

W. TAYLOR, R. E. ATKINSON & D. M. NESBIT.
APPARATUS FOR CONTROLLING TEMPERATURE AND HUMIDITY.
APPLICATION FILED OCT. 23, 1908.

1,017,345.

Patented Feb. 13, 1912.

2 SHEETS—SHEET 1.

WITNESSES
W. P. Burke
Vern G. Smith

INVENTORS
William Taylor
Robert Ernest Atkinson
David Mein Nesbit

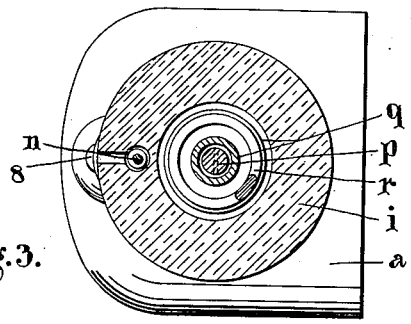
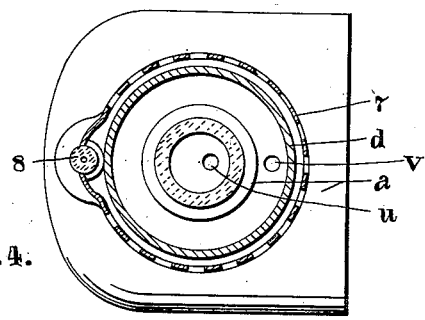
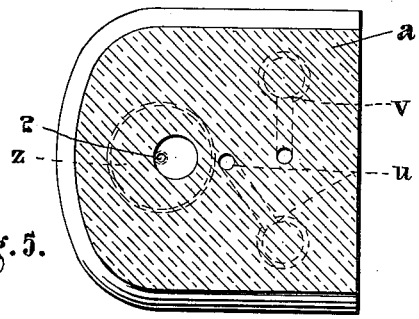

UNITED STATES PATENT OFFICE.

WILLIAM TAYLOR, OF LEICESTER, ROBERT ERNEST ATKINSON, OF KNIGHTON, AND DAVID MEIN NESBIT, OF LEICESTER, ENGLAND.

APPARATUS FOR CONTROLLING TEMPERATURE AND HUMIDITY.

1,017,345.        Specification of Letters Patent.    Patented Feb. 13, 1912.

Application filed October 23, 1908. Serial No. 459,263.

*To all whom it may concern:*

Be it known that we, WILLIAM TAYLOR, a subject of the King of Great Britain and Ireland, and residing at Abbotsbury, Upper New Walk, Leicester, in the county of Leicester, ROBERT ERNEST ATKINSON, a subject of the King of Great Britain and Ireland, and residing at Jesmond Dene, Morland avenue, Knighton, in the county of Leicester, and DAVID MEIN NESBIT, a subject of the King of Great Britain and Ireland, and residing at Barkby Lane, Leicester, in the county of Leicester, England, have invented certain new and useful Improvements in Apparatus for Controlling Temperature and Humidity, of which the following is a specification.

This invention relates to apparatus such as is used for controlling the temperature or the humidity of the air in rooms, factories, trains, ships and the like, and particularly to that class of instrument by which variations of temperature or humidity causing corresponding expansion or contraction of a prime governing member are made thereby to control the supply of a fluid agent, such as air, to a motor which actuates the valves, damper, spray, or other controlling member of the heating or humidifying apparatus.
The principal object of this invention is to provide an instrument which shall control temperature or humidity within smaller limits of variation than heretofore, and shall contain parts of the simplest character not liable to derangement.

It is usual with air-actuated motors of the kind generally employed in connection with air-controlling thermostats, to provide a weight or spring which actuates the motor in one direction while the air controlled by the thermostat actuates the motor in the contrary direction; and in order that the weight or spring may be free to actuate the motor when the air supply is cut off by the thermostat it is usual to vent the motor, which is sometimes done by providing it with a permanent leak. Such a leak however, if large, entails considerable waste of air, and if small is liable to become choked and inoperative by the deposit of dust.

It is a further object of this invention to provide a leak of such a character and so protected that it may be very small without becoming choked.
In air-controlling thermostats in which for their greater rigidity solid expansion members are employed, it has been usual, when great sensitiveness is required, to employ expansion members of very considerable and often inconvenient length, or else to employ levers or other devices to produce from the movement of a shorter expansion member, an increased movement of the fluid-controlling valve. In addition to such magnifying levers, Bourdon tubes and other devices have been used to further increase or to modify the sensitiveness of thermostats. In thermostats, as heretofore made, valves have been used of a very small size relatively to the length of the expansion member, and where vents or leaks have been employed these have been of a size comparable with the size of the valves. Moreover, the valve seats have been formed with a relatively large surface of contact with the valve, thus obstructing the free passage of air when the valves are but slightly opened. Now by means of this invention we secure the desired sensitiveness merely by using valves and leaks of suitable character and proportions, and we thus dispense with the usual magnifying levers and other like devices.

Our invention may be used to control motor-actuating-fluids either in compression or tension, and since in the case of a heating system when the radiators are served with a heating medium at less than atmospheric pressure, air in tension is easily provided by piping between the radiator and the thermostat, this invention will be described and illustrated with reference especially to such a system though it is not confined to such.

Figure 2:
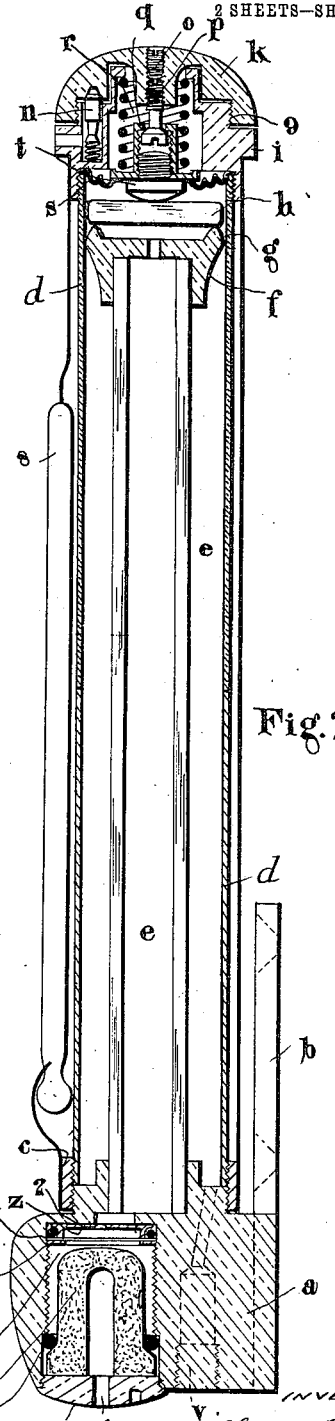

In the accompanying drawings which illustrate one form of thermostat or humidostat according to the invention, Figure 1 is a front elevation, and Fig. 2 a sectional elevation, the section being taken from front to rear. Fig. 3 is a cross section on the line A—B of Fig. 1. Fig. 4 is a cross section on the line C—D of Fig. 1, and Fig. 5 is a cross section on the line E—F of Fig. 1.

In carrying out the invention according to one mode as in the application to an instrument designed for attachment to a wall, a base, $a$, of metal, or the like material which is secured to the wall by means of a detachable lug or wall plate, $b$, has fixed to it, preferably by means of an exterior screw collar, $c$, a tubular expansion member, $d$, whose length is intended to be affected by changes of temperature or humidity or both. As a material for the expansion member, *d*, having a fairly high co-efficient of temperature expansion, we prefer to use hard vulcanized rubber, and in order to enhance its heat-absorbing and radiating power and thus its responsiveness to sudden changes of temperature we use rubber with a black and dull, that is, unpolished surface. As a material for the expansion member, *d*, sensitive to changes of humidity, we prefer one which is expanded by an increase of humidity and we employ, for example a tube of gelatin which we prefer to treat as with bichromate of potash and exposure to light, so as to render it insoluble, and to which we may add salts, glycerin, or other agent with the object of modifying its mechanical rigidity or its avidity for moisture and its sensitiveness to changes of humidity. When we wish to control the temperature of a room with reference to the humidity of its atmosphere, or when as in greenhouses, dwellings, textile mills and the like, we wish to control the supply of moisture to the atmosphere with reference to the prevailing temperature, we construct the expansion member, *d*, as to its length, partly of material sensitive to temperature changes and partly of material sensitive to changes of humidity in any required proportions. Or we may employ one material such as gelatin whose length is expanded both by heat and moisture.

Socketed in the beforementioned base, *a*, centrally within the tubular member, *d*, is fixed a tubular strut, *e*, of glass, porcelain, or the like material having a low co-efficient of temperature expansion and practically or wholly unaffected as to its length by moisture. A valve seat, *f*, nearly filling the tubular expansion member, *d*, preferably of a diameter as shown about one eighth of the length of the expansion member *d*, and having a sharp sloping edge, *g*, upon which dust cannot easily collect, is fixed upon the strut, *e*, the diameter of the edge or seating, *g*, filling as much as possible of the diameter of the tubular expansion member, *d*. A valve disk, *h*, whose under face is preferably a plane surface, and which we prefer to make of glass, rests upon the sharp edged seating *g*, and fits loosely within the expansion member *d*. A ring *i*, into which the top of the member, *d*, is fixed, is partly threaded as at 9, to receive a cap *k*, capable of being turned by hand. A temperature or humidity scale, *l*, is marked on the cap *k*, and a pointer, *m*, is provided on the ring, *i*. A spring lock bolt, *n*, seated within the ring *i*, engages holes in the cap, *k*, corresponding with the division of the scale, *l*, and is released when necessary by a suitable key. Adjustably fixed by a lock screw, *o*, in the center of the cap, *k*, is a screw *p*, against the head of which a collar, *q*, is urged by a compressed spring, *r*, whose other end abuts against an inturned flange on the ring, *i*. A diaphragm, *s*, of corrugated metal, celluloid, or the like, is clamped at its center to the collar, *q*, by a screw stud, *t*, and at its periphery is clamped between the tubular expansion member, *d*, and the ring, *i*, thereon and forms an air seal. Suitable ports, *u*, *v*, in the base, *a* to which piping may be connected, communicate respectively with the bore of the tubular strut, *e*, and the annular space between the strut, *e*, and the tubular expansion member, *d*.

Within and beneath the base, *a*, so that dust will fall from it gravitationally, is a chamber, *w*, communicating with the tubular strut, *e*, and in which is removably fixed, by a clamp ring, *x*, and an elastic sealing ring, *y*, a plate, *z* having in it a small pin hole 2 of about one hundredth of an inch diameter shown as about one twelve thousandth the area of the valve seat *g* such pin holes or leaks as usually constructed with a length of one or more diameters invariably become choked with dirt, but we chamfer the pin hole at one or both sides to a sharp edge and thus prevent the lodgment of dust therein; and to further prevent the access of dust, a filter, 3, of porous carbon or the like material is removably fixed in the chamber, by a screw cover 4 and sealed by an elastic ring, 5, the arrangement being such that air passing from the central open cavity 6 of the filter 3, through its porous walls escapes from its large exterior surface at a low velocity into the annular cavity and passes thence upward to the small pin hole 2 so that dust is not liable to be carried to and choke the pin hole.

A perforated casing 7 surrounds and protects the expansion member, *d*, and serves to carry an ordinary thermometer and scale 8.

In use the action of the apparatus is as follows:—If, for example, it is intended to control the temperature only of the room, in which the thermostat is fixed, by actuating the steam valve of a radiator or radiators (such a valve, for example, as is described in the specifications to Patent Nos. 869612 and 893124) the port, *u*, leading to the strut, *e*, is connected by piping to the motor chamber of the steam valve, and the other port, *v*, leading to the annular space between the strut, *e*, and the expansion member, *d*, is connected to a vacuum pump or its equivalent. If now the temperature of the room be such that the expansion member, *d*, is contracted so as to release the head of the screw, *p*, from the collar *q*, so that the valve disk, *h*, is closed by the pressure of the spring, *r*, acting thereon through the stud, *t*, no air will be drawn past the valve disk, *h*, but air will be free to pass through the filter 3 and pin hole 2 until the pressure within the port $u$, leading to the strut $e$, and in the motor chamber of the steam valve, is the normal pressure of the atmosphere, and the steam valve spring or its equivalent will open the valve and admit steam to the radiators. When the temperature of the room reaches that at which the thermostat is set, the expansion member $d$, will have expanded until the beforementioned stud $t$, is just raised from the valve disk $h$, past which air will be drawn, thereby reducing the pressure in the motor chamber of the steam valve and causing air to be drawn also through the pin hole 2. When the expansion member, $d$, has expanded until the air drawn past the valve disk, $h$, is in excess of that leaking through the pin hole 2, the pressure in the motor chamber of the steam valve will gradually fall and the steam will thereby be shut off until only sufficient is supplied to maintain the required temperature of the room. The object of the leak at 2 is to enable a balance to be established as between the action of the steam valve spring and the opposing action of the air on the motor diaphragm, thereby permitting steam to be partially turned on when so required and avoiding alternations between no steam and full steam which would otherwise be inevitable. The temperature of the room can be varied at will by turning the cap, $k$, according to the scale $l$, thereon. The screw $p$, with its locking screw, $o$, is used to adjust the instrument so that the valve disk $h$, acts at the temperature indicated by the scale $l$.

The sensitiveness of a thermostat of this character may be measured by that rise of temperature which will open the thermostat valve sufficiently to close the steam valve besides supplying the wastage of the vent or leak. It will be seen that in our form of thermostat we attain such sensitiveness by using an exceedingly small leak of only about one hundredth of an inch diameter, by employing a valve of relatively very large diameter with a plane face normal to the direction of expansion of the expansion member and co-acting with a sharp-edged valve seat of similarly large diameter, the sharp edge offering the minimum resistance to the passage of air, and the large diameter giving correspondingly large area of opening when the valve is but slightly displaced from its seat. The sensitiveness and accuracy are further promoted by the arrangement of the spring $r$ having an abutment in the ring $i$ and serving to eliminate all backlash from the screw of the adjustable cap $k$ and from between the screw $p$ and the collar $q$ so that the valve closing stud $t$ is held in rigid operative relation to the ring $i$ and to its end of the expansion member $d$. It will be seen that the air from the room drawn through the leak Z passes up the tubular strut $e$ through the valve $h$ and returns downward around the strut $e$ and within the expansion member $d$, thus causing both the inner and outer surfaces of the strut $e$ and of the expansion member $d$ to be affected by the temperature or humidity of the air of the room, thereby increasing the responsiveness of the instrument.

When we make the expansion member of the instrument partially or wholly of material sensitive to changes of humidity we prefer to use a material such as gelatin which expands with any increase of moisture rather than one which thus contracts, because thereby we are enabled readily to satisfy psychrometric conditions which demand for any increase of humidity a certain corresponding decrease of temperature. Instruments have been proposed in which an expansion member sensitive to heat changes has been provided with a wet jacket on the principle of the wet bulb thermometer; and woven and twisted fabrics have been employed as expansion members sensitive to changes of humidity. In all such cases however contraction instead of expansion occurs with any increase of humidity and therefore such members cannot be conjoined into one with members sensitive only to heat changes to control temperature with reference to humidity or humidity with reference to temperature psychrometrically as in the present invention.

Having now described our invention, what we claim as new and desire to secure by Letters Patent is:—

1. In a thermostat for controlling temperature with reference to humidity, a compound expansion member part of the length of which is composed of a substance which expands with increase of temperature, and part of a substance which expands with increase of humidity substantially as described.

2. In a thermostat for controlling temperature with reference to humidity, the combination with a valve for controlling a motor-actuating fluid, of a compound expansion member adapted to actuate the valve and part of the length of which is composed of a substance which expands with increase of temperature, and part of a substance which expands with increase of humidity substantially as described.

3. In a humidostat for controlling humidity with reference to temperature a compound expansion member part of the length of which is composed of a substance which expands with increase of temperature, and part of a substance which expands with increase of humidity substantially as described.

4. In a humidostat for controlling humidity with reference to temperature, the combination with a valve a motor-actuating fluid, of a compound expansion member adapted to actuate the valve and part of the length of which is composed of a substance which expands with increase of temperature, and part of a substance which expands with increase of humidity substantially as described.

5. The combination with a controlling instrument of the kind herein referred to, comprising a tubular expansion member part of the length of which is composed of a substance which expands with increase of temperature and part of a substance which expands with increase of humidity, a relatively non-expanding tubular member in the aforesaid expansion member, a valve actuated by the expansion member and for the purpose of controlling the flow of a fluid agent acting on the expansion member and circulated longitudinally through the inner member and through the annulus between the members, substantially as described.

6. The combination with a controlling instrument of the kind herein referred to, comprising a tubular expansion member part of the length of which is composed of a substance which expands with increase of temperature and part of a substance which expands with increase of humidity, a second tubular member lengthwise therein, a union for the members at one end, a valve on the free end of the inner member and within the outer member, an abutment actuated by the free end of the outer member to close the valve the aforesaid union having ports for permitting the circulation of fluid longitudinally through the inner member, the valve, and the annulus between the members, substantially as described.

7. The combination with a controlling instrument of the kind herein referred to comprising a tubular expansion member, a second tubular member lengthwise therein, a union for the members at one end, a valve on the free end of the inner member and within the outer member, and an abutment actuated by the free end of the outer member to close the valve, said union having ports, communicating respectively with the inner member and the annulus between the members for permitting the circulation of fluid longitudinally through the inner member, the valve, and the annulus.

8. In a controlling instrument of the kind herein referred to, the combination with a tubular expansion member part of the length of which is composed of a substance which expands with increase of temperature and part of a substance which expands with increase of humidity, said expansion member forming a chamber for a fluid agent, and containing a valve for controlling the fluid, a valve seat, an abutment to close the valve, and a closure for one end of the tubular member, of a flexible diaphragm to seal the other end and means therewith for adjusting the abutment relatively to the expansion member, substantially as described.

9. A controlling instrument of the kind herein referred to comprising a tubular expansion member, a second tubular member therein, a union for the members at one end, a valve on the inner member actuated directly by the expansion member and adapted to control a working fluid, a cap for the expansion member, an abutment for closing the valve, means actuated by rotation of the cap to vary the longitudinal position of the abutment, and means as at $n$ for locking the cap in any adjusted position, substantially as described.

10. In a controlling instrument of the kind herein referred to, the combination with a tubular expansion member, means for separately permitting ingress and egress of a fluid agent to and from the tubular expansion member, a valve in the expansion member for controlling the fluid agent, an abutment actuated by one end of the expansion member to close the valve, and means for adjusting the abutment longitudinally, of a spring permanently under stress and acting between the adjustment means and the end of the expansion member to take up backlash in said adjusting means, and to prevent damage to the instrument when the expansion member shrinks farther than is necessary to close the valve.

11. In a controlling instrument of the kind herein referred to, the combination with a tubular linear-expansion member having means for permitting ingress and egress of a fluid agent to and from its interior, of a valve actuated by the expansion member to control the fluid agent, said valve having a substantially flat face normal to the direction of motion of the expansion member, an annular valve seat with which said valve co-acts said seat having its acting edge sharp and beveled so as to offer minimum resistance to the passage of the fluid agent and to prevent the lodgment of dust thereon, substantially as described.

12. In an instrument of the kind herein referred to for controlling a fluid agent, the combination with an expansion member and a valve-closing abutment actuated thereby, of a valve having a substantially flat face normal to the direction of motion of the abutment and co-acting with an annular valve seat having its acting edge sharp and beveled so as to prevent the lodgment of dust thereon and to offer minimum resistance to the passage of the fluid agent, substantially as described.

13. In a controlling instrument of the kind herein referred to, the combination with a tubular expansion member having means for permitting ingress and egress of a fluid agent to and from its interior, of a valve therein actuated by the expansion member to control the fluid agent, said valve having a substantially flat face normal to the axis of the tubular expansion member and co-acting with an annular valve seat having its acting edge sharp and beveled so as to offer minimum resistance to the passage of the fluid and to prevent the lodgment of dust thereon substantially as described.

14. In an instrument of the kind herein referred to for controlling a fluid agent, the combination with an expansion member and an abutment actuated thereby, of a valve actuated by the abutment and having a substantially flat face normal to the direction of motion of the abutment and co-acting with an annular valve seat having its acting edge sharp and beveled, its circumference being not less than one-sixth the length of the expansion member substantially as described.

15. In an instrument of the kind herein referred to for controlling a fluid agent, the combination with a tubular expansion member having entrance and exit ports for the fluid agent, of a valve therein, an abutment, to close the valve actuated by the expansion member, said valve having a substantially flat face normal to the direction of motion of the abutment, and an annular valve seat having its acting edge sharp and beveled and a circumference not less than one-sixth the length of the expansion member substantially as described.

16. In an instrument of the kind herein referred to for controlling a fluid agent, the combination with an expansion member, a chamber for the fluid having ports for its entrance and exit respectively and an additional aperture permanently in communication with the entrance port and through which the fluid can leak, of a valve actuated by the expansion member to control the fluid agent, and an annular valve seat co-acting therewith and having an area at least 500 times that of the said aperture through which the fluid leaks, substantially as described.

17. In an instrument of the kind herein referred to for controlling a fluid agent, the combination with an expansion member, forming a chamber for the fluid and a support for the expansion member having ports for the entrance and exit respectively of the fluid and an additional aperture permanently in communication with the entrance port and through which the fluid can leak, of a valve within the expansion member and actuated thereby to control the fluid, and an annular valve seat co-acting with the valve and having an area at least 500 times that of the said aperture through which the fluid leaks substantially as described.

18. In an instrument of the kind herein referred to for controlling a fluid agent, the combination comprising an expansion member, a valve actuated thereby to control the fluid, a chamber for the fluid having ports for its entrance and exit respectively, and an additional permanent aperture through which the fluid can leak to or from the controlled side of the instrument, the said aperture being formed by chamfering a hole to a sharp edge so as to prevent the lodgment of dust therein, substantially as described.

19. In an instrument of the kind herein referred to for controlling a fluid agent, the combination comprising an expansion member, a valve actuated thereby to control the fluid, a chamber for the fluid having ports for its entrance and exit respectively, and an additional permanent aperture through which the fluid can leak to or from the controlled side of the instrument, the said aperture being formed in a piece removable for cleaning, and having means for holding and sealing it to the fluid chamber, substantially as described.

20. In an instrument of the kind herein referred to for controlling a fluid agent, and comprising an expansion member and a valve actuated thereby to control the fluid, the combination with a chamber for the fluid having ports for its entrance and exit respectively and an additional permanent aperture through which the fluid can leak, of a second chamber communicating with said aperture, a removable hollow filter for the fluid entering the aperture, the filter being so arranged as to leave an annular space between itself and the chamber, and means for sealing and holding the filter removably in the chamber, substantially as described.

In testimony whereof we have signed our names to this specification in the presence of two subscribing witnesses.

WILLIAM TAYLOR.
ROBERT ERNEST ATKINSON.
DAVID MEIN NESBIT.

Witnesses:
WALTER W. BALL,
F. HOOD.